O. E. Randall,
Horse Rake.
No. 47857 — Patented May 23, 1865.
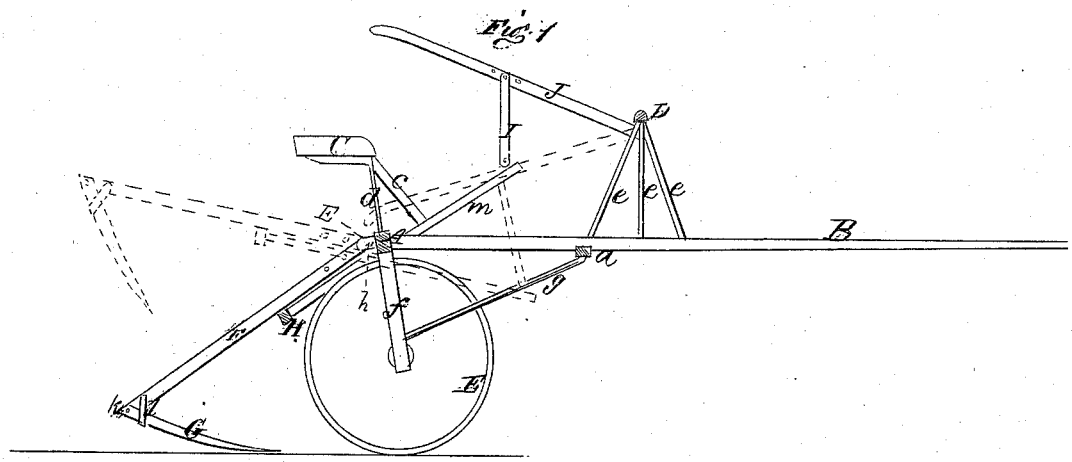
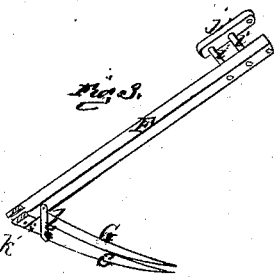
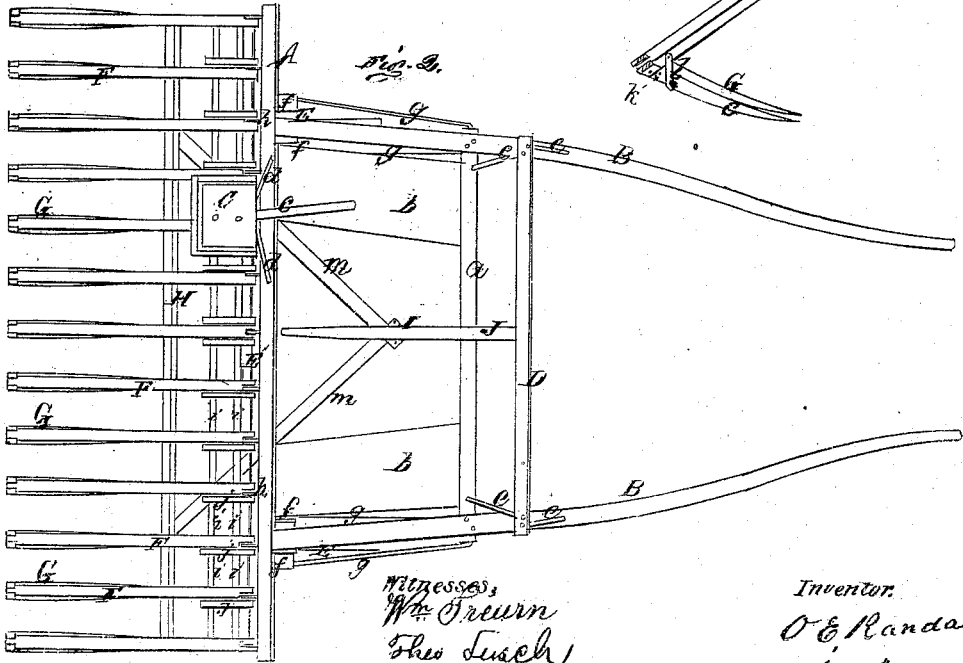
Witnesses:
Wm. Treurn
Theo Tusch
Inventor:
O. E. Randall
per Munn & co
Attorneys

UNITED STATES PATENT OFFICE.

O. E. RANDALL, OF LEWISTON, MAINE.

IMPROVEMENT IN HORSE-RAKES.

Specification forming part of Letters Patent No. 47,857, dated May 23, 1865.

*To all whom it may concern:*

Be it known that I, O. E. RANDALL, of Lewiston, in the county of Androscoggin and State of Maine, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a side elevation of my invention; Fig. 2, a plan or top view of the same; Fig. 3, a detached perspective view of the tooth-bars of the same with teeth attached.

Similar letters of reference indicate like parts.

This invention consists in having the rake composed of a series of bars constructed in a novel way and placed loosely on a shaft or rod, with two teeth attached to each bar, the above rake being applied to a mounted frame having its wheels at a less distance apart than the length of the rake, so that the ends of the latter may project beyond the wheels, all being arranged in such a manner that all the advantages of the ordinary wooden and wire tooth rakes are retained, while their disadvantages are avoided.

The framing of the machine is composed of a bar, A, to which the thills B B are attached, said thills being connected near their rear ends by a cross-bar, $a$, into which and the bar A boards $b\ b$ are framed to serve as platforms. (See Fig. 2.)

C represents the driver's seat, which is supported at a suitable height by a bar, $c$, and two brace-rods, $d\ d$; and D is a horizontal bar, which is supported at a suitable height above the thills B B by rods or bars $e$.

The bar A of the framing is provided at a short distance from each end with two pendants, $f\ f$, between the lower parts of which the axles of the wheels E E of the machine are placed. These pendants are braced from the cross-bar $a$ of the thills by rods $g$.

At the rear of the bar A there are attached a series of short arms, $h$, in which a rod or shaft, E′, is fitted, and on which a series of bars, F, are placed loosely. These bars F are constructed of wood, and each has two arms, $i\ i$, projecting from it at right angles, the ends of said arms being fitted in a bar, $j$, which is parallel with the bars F. (See Figs. 2 and 3.) The bars $j$ F are both fitted on the rod or shaft E′, and this mode of construction prevents any lateral play of the bars F on said rod or shaft. The lower ends of the bars F have each two teeth, G G, attached to them. These teeth are of wood, and they may be secured to the lower ends of the bars F by means of rivets or bolts $k$ and a metal strap, $l$. The teeth G form an acute angle with the bars F, and they rest or run upon the ground in a position favorable for the raking up of the grain or hay, as will be understood by referring to Fig. 1.

H is a bar which is parallel with the bar A of the framing, and has two oblique bars, $m\ m$, attached to it, the front ends of which are secured together, and are connected by a link, I, with a lever, J, the fulcrum of which is attached to the bar D. The front ends of the oblique bars $m\ m$ extend forward nearly to the cross-bar $a$ of the thills B B. By drawing back the upper end of the lever J, the bar H will throw up the bars F and raise the teeth G G above the surface of the ground. By this means the rake is made to discharge its load, and the teeth allowed to pass over obstructions, while each bar, with its pair of teeth, is allowed to rise and fall independently of the other.

In consequence of the ends of the rake projecting beyond the wheels B B, the former is allowed to work or pass along close to fences or other obstacles, and perform its work in a clean and efficient manner.

The providing of the bars F with two teeth each is a great advantage, as the rake is made to perform its work in a clean and thorough manner, while strength and durability are obtained.

Having thus described my invention, I claim as new and desire to secure by Letters Patent—

The combination of the bars F, arms $i\ i$, shaft E′, and teeth G G, all constructed, arranged, and operating substantially as set forth.

O. E. RANDALL.

Witnesses:
WILLIAM G. COLBURN,
J. B. THAYER.